Dec. 3, 1963   E. KELLER ETAL   3,112,844
MEASURING AND DISPENSING APPARATUS
Filed May 23, 1960   4 Sheets-Sheet 1
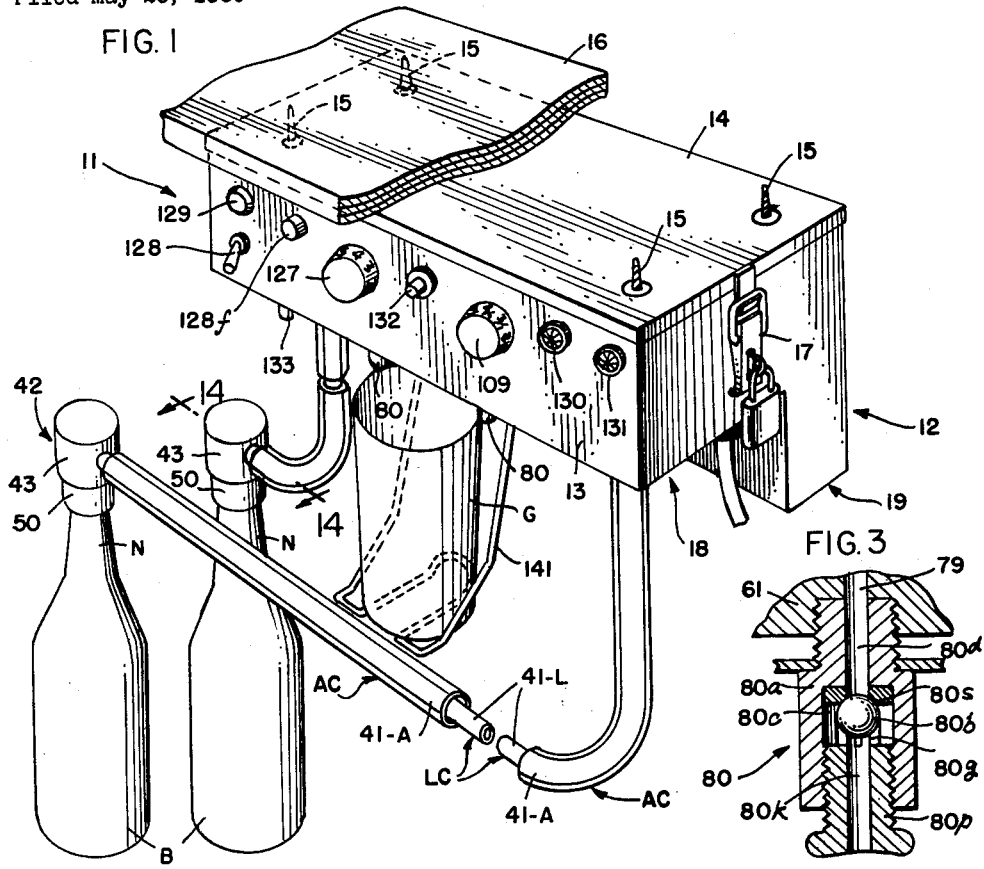
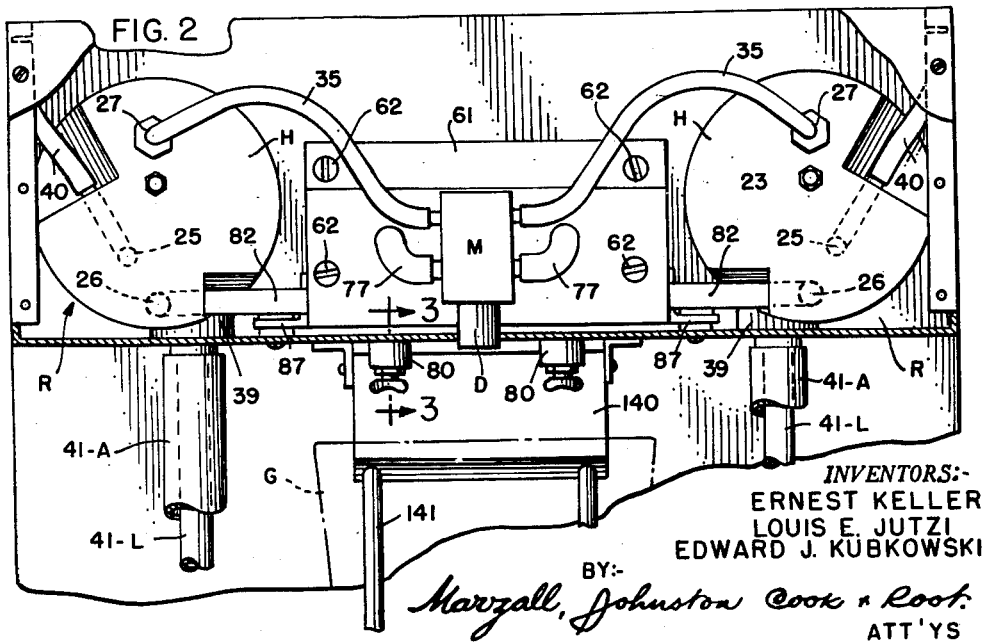
INVENTORS:-
ERNEST KELLER
LOUIS E. JUTZI
EDWARD J. KUBKOWSKI
BY: Marzall, Johnston Cook & Root
ATT'YS

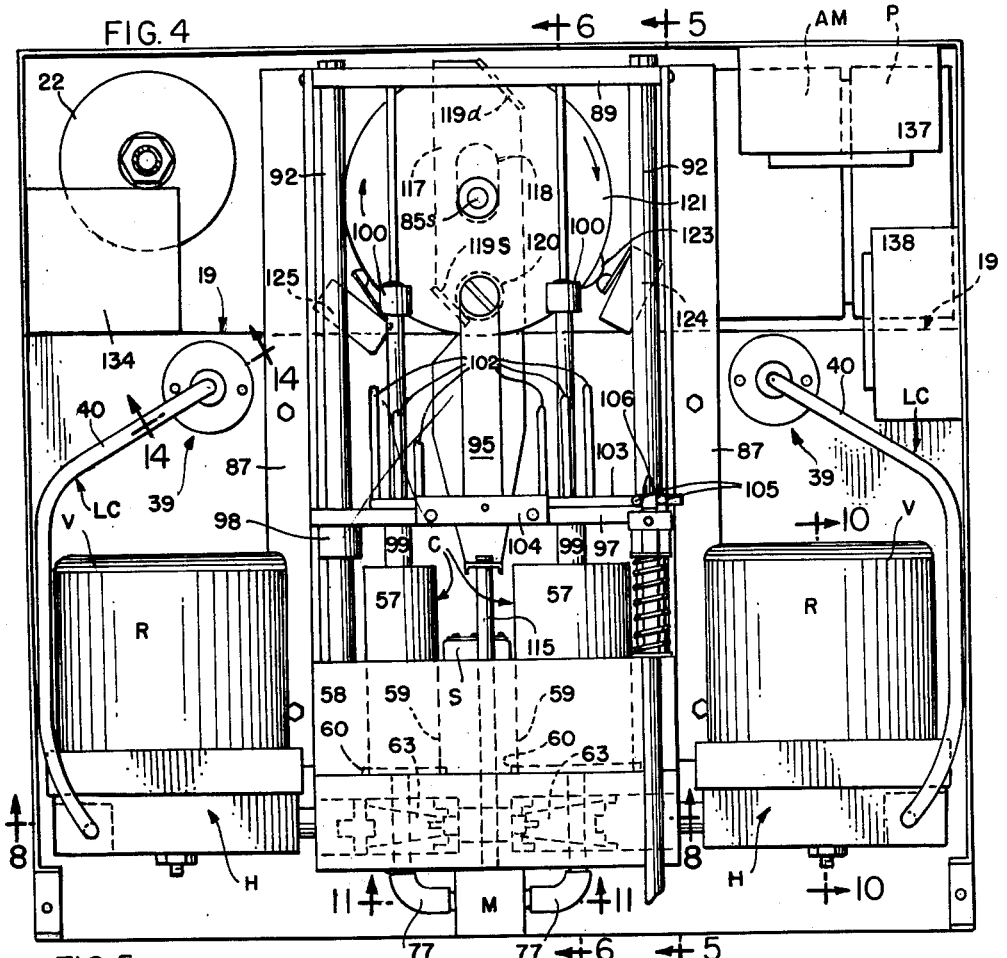
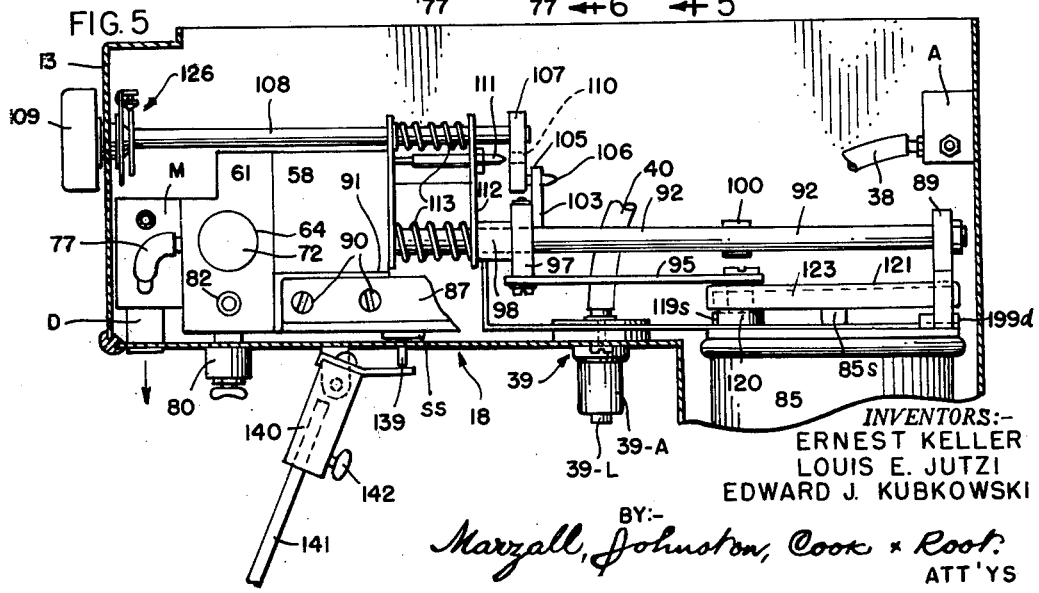

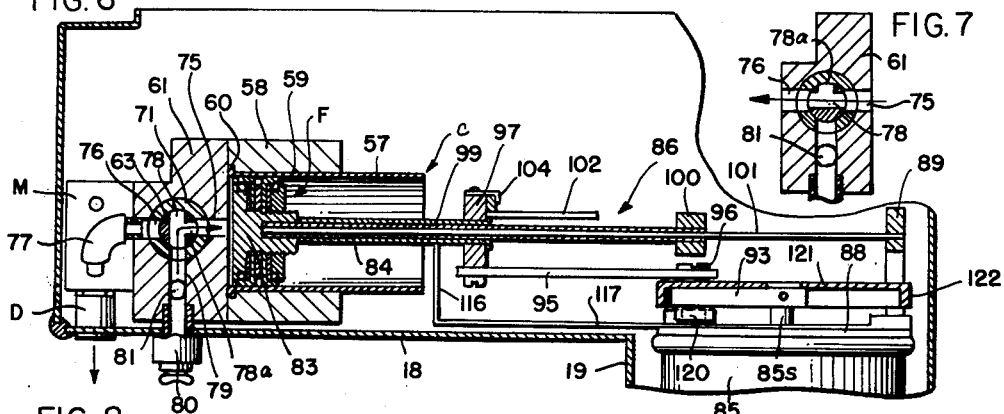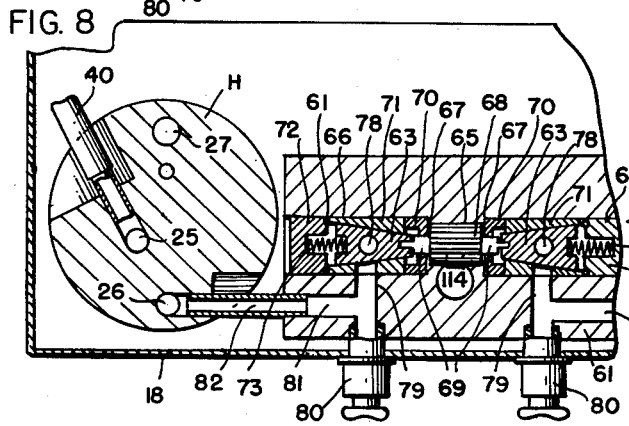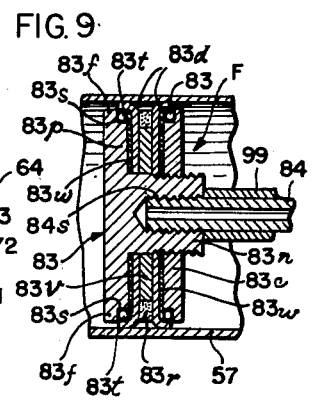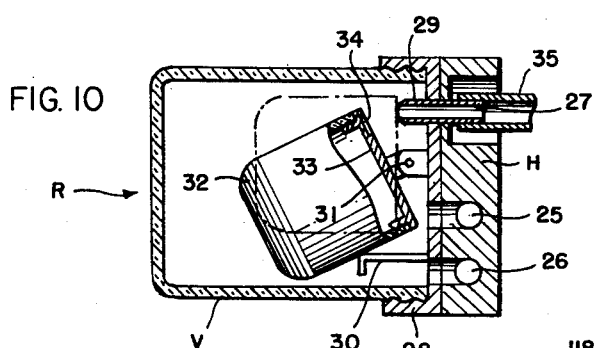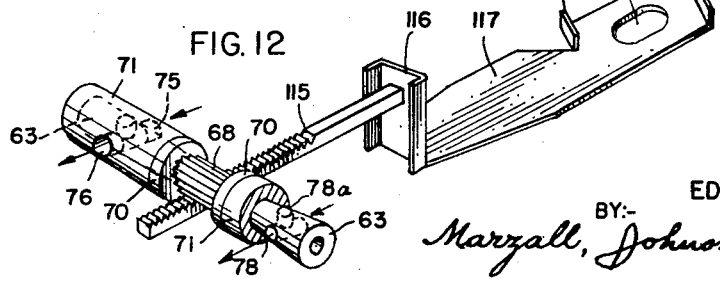

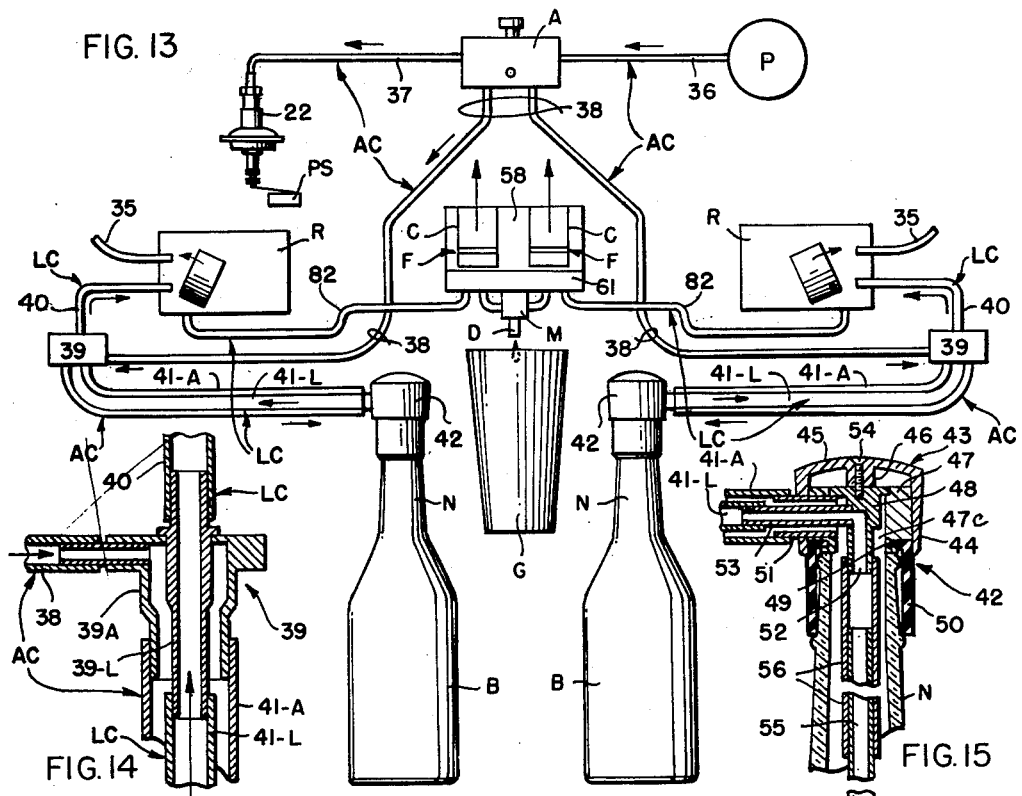
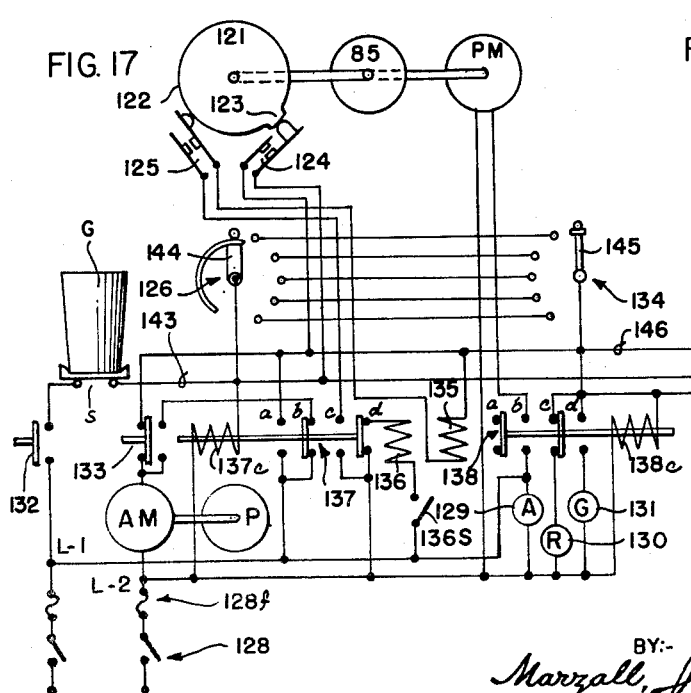
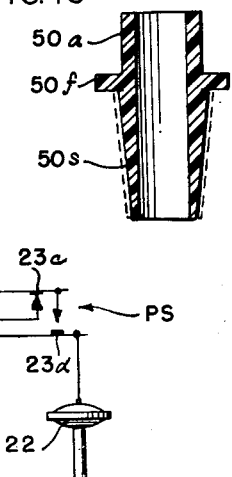

United States Patent Office 3,112,844
Patented Dec. 3, 1963

3,112,844
MEASURING AND DISPENSING APPARATUS
Ernest Keller, 2330 N. Mobile Ave., Chicago, Ill.; Louis E. Jutzi, 7717 S. Laflin St., Chicago, Ill.; and Edward J. Kubkowski, 740 N. Brainard Ave., La Grange Park, Ill.
Filed May 23, 1960, Ser. No. 30,811
25 Claims. (Cl. 222—61)

The present invention relates in general to the measurement of fluids, and has more particular reference to apparatus for dispensing mixtures comprising fluid components in precisely determined proportions, the invention specifically pertaining to apparatus adjustable to dispense measured quantities of liquid mixtures containing exactly proportioned ingredients, in rapid succession, the apparatus thus being well adapted for the automatic dispension of correctly proportioned beverage mixtures of the sort served at cocktail bars.

An important object of the present invention is to provide a relatively inexpensive yet reliable measuring device for drawing precisely measured amounts of different fluids from corresponding supply sources, then mixing the so measured fluids for delivery as a dispensation unit quantity; a further object being to provide apparatus readily adjustable for the successive delivery of any desired number of identically proportioned dispensation unit quantities, within the capacity of the apparatus; a further object being to provide apparatus adjustable to vary the proportion of the component fluids in the dispensed mixture.

Another important object is to provide a plurality of piston pumps, one for each component of a fluid mixture to be dispensed, each pump being adapted for connection with a corresponding fluid supply source, and means for individually controlling the strokes of the pumps to thereby determine the amount of fluid drawn by each from its corresponding supply source, said pumps being connected with a common mixing and discharging manifold to and through which precisely measured fluid components may be delivered from the pumps and mixed together for discharge from the apparatus as a dispensation unit quantity.

Briefly stated, the present invention contemplates the provision of apparatus adapted for connection with a plurality of fluid supply sources, such as liquor bottles or other fluid containers, and for utilizing pneumatic pressure for delivering fluids from the containers to corresponding storage reservoirs, whence the fluids may be drawn, as by action of adjustable measuring pumps, and discharged thence as a precisely proportioned mixture forming an exactly measured dispensation unit quantity, the apparatus being adjustable to obtain any desired one of several relatively proportioned mixtures within the adjustable limits of the device, and to deliver either a single dispensation unit quantity or any desired number of dispensation unit quantities, one after the other, within the capacity of the apparatus, suitable control means being provided to disable the equipment in the event that a fluid supply source should become exhausted, or in the event that pneumatic pressure for the operation of the system should fail.

More particularly, the present invention contemplates the provision of an automatic mixed drink dispensing device adjustable to deliver any selected number of precisely proportioned mixed drinks, in rapid succession and without spillage, it being merely necessary to attach the equipment to bottles containing drink components, adjust the component proportioning and drink number controls and thereafter to dispose a cocktail shaker or other receiving vessel in drink-receiving position, at the mixed drink discharge spout of the apparatus.

The foregoing and numerous other important objects, advantages and inherent functions of the invention will become apparent as the same is more fully understood from the following description which, taken in connection with the accompanying drawings, discloses a preferred embodiment of the invention.

Referring to the drawings:

FIG. 1 is a perspective view of a fluid mixing and dispensing unit embodying the present invention;

FIG. 2 is a view of the apparatus disposed immediately behind the front or control panel of the unit shown in FIG. 1;

FIG. 3 is an enlarged section view taken substantially along the line 3—3 in FIG. 2;

FIG. 4 is a plan view of the apparatus disposed immediately beneath the top cover of the unit shown in FIG. 1;

FIGS. 5, 6, 8, 10, 11 and 14 are sectional views respectively taken substantially along the lines 5—5, 6—6, 8—8, 10—10, 11—11 and 14—14 in FIG. 4;

FIG. 7 is a sectional view showing, in relatively turned position, a valve forming a component part of the mechanism shown in FIG. 6;

FIG. 9 is an enlarged sectional view of a piston illustrated in FIG. 6;

FIG. 12 is a perspective view of mechanism forming a part of the apparatus illustrated in FIG. 4;

FIG. 13 is a diagrammatic view illustrating the several components of the mixing and dispensing apparatus embodying the present invention;

FIG. 15 is a sectional view taken substantially along the line 15—15 in FIG. 1;

FIG. 16 is a sectional view of an adapter sleeve; and

FIG. 17 is a diagram of electrical circuits for controlling the operation of the mixing and dispensing device.

To illustrate the invention the drawings show fluid mixing and dispensing apparatus 11 comprising components mounted within and enclosed by a generally rectangular housing 12, having preferably integrally interconnected opposite side, bottom and rear walls, a readily demountable front wall or panel 13 secured as by means of screw fasteners to and between the opposite side walls and to the bottom wall, at the front of the housing, and a detachable top wall 14 providing a removable cover for the open top of the housing, said detachable top wall 14 being securable, as by means of fastening screws 15, to the underside of a table or counter top 16, as of the sort commonly provided in beverage service bar structures. Lockable latch means 17 may be provided, at the opposite sides of the housing 12, for securing the same removably to the cover, so that the housing 12 and its contents may be readily detached from the cover and removed from beneath the table top for inspection and repair or adjustment, while the top wall or cover 14 remains in situ secured to the underside of the counter top 16. As shown, the forward portions 18 of the housing 12 immediately behind the front wall or panel 13 may be relatively shallower than its rearward portions 19.

The apparatus 11, as shown in FIG. 13, comprises a hydraulic pumping, measuring, mixing and dispensing system embodying fluid receiving reservoirs R, and preferably electric motor driven, variably adjustable, proportional pump means having measuring cylinders C and associated pistons F operable therein to draw measured quantities of fluid from the reservoirs and to discharge the same through a mixing chamber having a delivery or dispensing spout or nozzle D.

As further shown in FIG. 13, the apparatus 11 may also comprise a pneumatic pressure system embodying a preferably electric motor driven air pump P, a pressure regulating valve A and suitable conduit means for applying air pressure upon fluid components to be mixed in order to deliver the same to the reservoirs R from supply or storage sources thereof, such as bottles B or other fluid containing vessels.

As shown in FIG. 17, the apparatus may furthermore include an electrical system for driving and controlling the air pump and piston pump means, said electrical system including an air pump driving motor AM, a proportional measuring pump driving motor PM, several different kinds of control switches and suitable circuitry interconnecting the switches and motors.

Suitable liquid delivery conduit means LC may be provided for interconnecting the reservoirs R each with a corresponding fluid supply source B, and the air pump P may be connected with the supply sources B, as by suitable pneumatic pressure conduit means AC. The conduit means LC and AC may conveniently comprise vinyl plastic tubing, although any other suitable tubing material may be used. The pneumatic system comprising the air pump P and conduit means AC may also be connected with a fluid pressure responsive device 22 controllingly connected with suitable means, such as electrical switching mechanism PS embodying a normally closed switch 23c and a normally open switch 23d, for conditioning the mixing and dispensing apparatus for operation only when pressure in the pneumatic system is at a proper operating level, and to disable the apparatus whenever pressure in the system falls below such level, as when a liquor bottle forming a supply source B becomes empty.

In order accurately to measure and mix the fluid components of the potion to be dispensed, the present invention contemplates that the proportional pump means may conveniently comprise a plurality of measuring pumps, one for each component of the mixture to be produced and dispensed, each pump comprising a cylinder C and cooperating piston F, the movement of which in the cylinder in one direction will serve to draw a quantity of fluid from the reservoir, through a delivery pipe 82 and into the cylinder, in an amount precisely proportional to the distance moved by the piston therein, movement of the piston in the opposite direction serving to eject the measured quantity of fluid from the cylinder into a common mixing and delivery chamber or manifold M. The several components of the potion to be dispensed may thus be discharged simultaneously by the several mixing pumps into the mixing chamber and delivered thence in mixed condition, as into a fluid receiver G such as a glass cocktail shaker held in position to catch the fluid mixture as discharged from the mixing manifold through its outlet spout D.

The reservoirs R may conveniently comprise each a preferably plastic block H forming the head of the reservoir and an open-ended, preferably cylindrical vessel V formed for screw threaded attachment at its open end on the block, said block being formed with an inlet channel 25, an outlet channel 26 and a vent 27, all opening through the block H into the open end of the container or vessel V, when the same is mounted on the block. The vessel V may conveniently comprise a conventional open-ended glass jar formed for threaded connection with a removable cover 28, which may comprise a molded plastic, such as Bakelite. The block H may conveniently comprise a body of epoxy resin molded or otherwise formed on or attached integrally to the cover 28, as by means of epoxy resin cement.

Each block H and jar cover 28 may be mounted in the housing 12 in position to support the jar with its central axis disposed horizontally, the vent 27 comprising a stub pipe 29 having an end projecting through the jar cover 28 and into the upper portions of the jar when the same is in mounted position on the cover 28. The inlet duct 25 may be disposed in the block H in position opening through the jar cover, into the mounted container, at or slightly below its central axis; and the outlet duct 26 is preferably disposed in position connecting with the lowermost portions of a mounted jar. A surge shield 30 may be formed on the cover 28 in position extending into the mounted jar immediately above the outlet duct 26.

The cover 28 may also carry a hinged mounting 31 for a float 32 within the mounted jar or vessel V, said float 32 comprising a hollow open-ended shell of plastic material such as styrene, or other preferred material, said shell being secured as by threaded engagement on the peripheral edge of a carrying disk 33, which may be mounted on the hinge 31. As a consequence, when the reservoir is empty, the float may rest against the baffle 30 in the position shown in solid lines in FIG. 10 of the drawings, and may swing upwardly on the hinge 31 as the reservoir becomes charged with fluid, to the position shown in dotted lines, in FIG. 10 in which the upper edge of the disk 33 comes into engagement with the inner end of the stub pipe 29, thereby closing the vent. The disk 33 may be provided with a resilient gasket 34 in position to engage and seal the inner end of the stub pipe 29, when the float attains the "reservoir-full" position shown in dotted lines in FIG. 10. Suitable preferably flexible plastic tubing 35, such as vinyl or other preferred material, may be employed to connect the outer ends of the stub pipes of the reservoirs R each with the mixing chamber M.

In order to deliver fluid components from the supply sources B to the reservoirs R, where such supply sources comprise closed containers, such as liquor bottles, air under pressure may be forced into the containers, as through the conduit means AC, in order to deliver the fluid from the bottles through the conduit means LC and into the reservoirs. The bottle connected ends of the conduit means LC may comprise pipes extending into the bottles through the necks thereof and opening near the bottle bottoms. Pneumatic pressure may be provided by operation of a preferably electric motor driven air compressor or pump P, which with its driving motor AM may be mounted within the relatively deep portion 19 at the rear of the housing 12. The pump P may be connected with a compressed air distribution and pressure regulating manifold A, as by means of a pipe or duct 36, whence compressed air may be applied to the switch actuating device 22 through a conduit 37. Compressed air may also be applied, from the manifold A, through air pipes 38, to combined air and liquid manifolds 39, one for each reservoir R and its associated supply source B. The manifold A may embody a chamber adapted for connection with the pipes 36, 37 and 38, the chamber being vented to atmosphere through a manually adjustable spring-pressed valve for determining the air pressure applied in the pipes 37 and 38.

The manifolds 39, as shown in FIG. 14, may each comprise a pair of tubular elements 39–A and 39–L which may conveniently be formed of plastic material, such as high impact polystyrene, and mounted concentrically, one within the other. The outer element 39–A, at one end, may be formed with an end opening sized to snugly receive the inner element 39–L, which may be formed with a peripheral mounting flange in position to overlie and to be cemented or otherwise sealed upon an end of the outer element, thereby presenting the other ends of the elements in concentric relationship. The inner element thus is supported on and by and extends coaxially through the outer element. At or near its end on which the inner element is mounted, the outer element may be provided with an outwardly extending connection nipple for attachment with one of the compressed air tubes 38. The end of the inner element which projects outwardly of its mounting flange may be connected with a preferably flexible tube 40, of suitable material such as vinyl plastic, leading to the inlet duct 25 of an associated reservoir R. The concentric ends of the manifold elements 39–A and 39–L may be connected with a corresponding supply source or bottle by means of a pair of preferably flexible tubes or pipes 41–A and 41–L which may conveniently be disposed coaxially one within the other. These coaxially arranged pipes, like the pipes 36, 37, 38 and 40, may be made of any suitable, preferred or convenient material, such as vinyl plastic, and one of them, such as the inner tube 41-L, may be connected with and through the inner manifold element 39-L with the conduit 40 which extends to and is connected with the inlet duct 25 of a corresponding reservoir. The other of the coaxially arranged tubes, such as the outer tube 41-A, may be connected with and through the outer manifold element 39-A with one of the air pipes 38.

Any suitable, preferred or convenient means may be employed for connecting the manifold remote ends of the air and liquid pipes 41-A and 41-L with the supply sources B. Where the supply sources comprise conventional necked liquor bottles, attachment caps 42 may be provided, said caps being connected with the manifold remote ends of the coaxial tubes 41-A and 41-L, and formed for sealed connection, in readily removable fashion, with the open end of bottle necks N. As shown more particularly in FIG. 15 of the drawings, the attachment caps 42 may each comprise a readily graspable cup-shaped member 43 having generally cylindrical side walls 44 and a bottom wall 45 which may be formed with a central boss 46 extending within the cylindrical walls 44.

Concentrically within the cylindrical walls 44 of the cup-shaped member a pair of ducted parts 47 and 48 may be assembled in interfitting coaxial relationship, the one within the other. The outermost of these parts may be formed with cylindrical walls sized for snug-pressed fitted assembly within the cylindrical walls 44 of the cup-shaped member, said part 47 being also formed with a radially outwardly opening groove 49 at an end thereof, to interfittingly receive an inwardly extending circular flange formed on an end of a sleeve of resilient rubber-like material 50, whereby the sleeve may be secured to the end of the part 47. The outer periphery of the sleeve 50 may be sized to form a continuation of the outer cylindrical surfaces of the part 47 and to extend outwardly of the open end of the cup-shaped member when the part 47 is assembled therein, the flanged end of the sleeve 50 being clampingly secured in the open end of the cup-shaped member, between the terminal edge of its walls 44 and the grooved portion of the part 47.

The part 47 is also preferably formed with a central axially extending chamber 47c within which the inner part 48 is concentrically mounted, said inner part being formed with an outwardly extending flange at one end sized to engage in a seat formed in the top of the outer part 47. The outer part 47 may be formed with a lateral opening communicating with the central chamber 47c and in which a sleeve 51 is sealingly secured, the sleeve extending radially outwardly of the part 47 through a lateral opening formed in the wall 44 of the cup-shaped member. The inner part 48 extends concentrically within the chamber 47c and outwardly of the open end thereof, said inner part being formed with an axial channel 52. A pipe 53 is secured at one end on the part 48 in open communication with the inner end of the axial channel 52, said pipe 53 extending radially outwardly of the part 48, coaxially within the sleeve 51, the outer end of the pipe 53 projecting outwardly of the outer end of the sleeve 51.

While the attachment caps 42 may be formed of any suitable or convenient material, the cup-shaped member 43 is preferably formed of relatively rigid plastic, such as linear polyethylene, while the outer and inner parts 47 and 48 and the radially extending sleeve and pipe 51 and 53 preferably comprise high impact polystyrene, the parts being assembled and secured together as by means of suitable cement before being mounted in the cup-shaped member 43 in engagement with the boss 46, to which the assembled parts may be secured as by means of a fastening screw 54, extending through the boss 46 and having threaded engagement with the inner part 48.

The inner part 48 provides a tube extending within the chamber 47c and forming the axial chamber 52. The outer end of such tube may be connected with the upper end of an elongated preferably plastic tube 55, as by means of a preferably flexible connection sleeve 56. The tube 55 may conveniently comprise clear polystyrene, or other suitable relatively rigid material, while the sleeve 56 may be made of vinyl plastic or other relatively flexible material. The tube 55 is preferably sized as to its length so that its open end may rest upon the bottom of a liquor bottle of conventional size when the attachment cap of which it is a part is mounted upon the open end of the bottle neck N. The lower end of the tube 55 may be formed with notches 55n through which fluid may pass into the bottom end of the tube when resting upon the bottom of the bottle. The attachment cap may be fastened to the open end of a bottle neck merely by grasping the cup-shaped member firmly, as a handle, to facilitate the insertion of the tube 55 into the neck, and by then bringing the cap down upon the top of the neck until the lower end of the outer part 47 becomes seated upon the open end of the neck, with the elastic sleeve 50 sealingly clasping the neck immediately adjacent the open end thereof.

In order to accommodate bottles of various depth, the tube 55 may be made just long enough to reach the bottom of the shortest bottle, when the upper end of the tube is mounted in the sleeve 56 in facing engagement with the lower end of the part 48. The sleeve 56, however, may be of substantial length so that the tube 55 may be disposed at any position therein as may be required to reach the bottom of taller bottles; and a second tube and sleeve like the tube and sleeve 55 and 56 may be provided for attachment at the lower end of the tube 55 to further extend the same for the accommodation of still deeper bottles.

To accommodate bottles having necks of larger than normal diameter, adapter collars, of the sort shown in FIG. 16, may be provided, said collars comprising resilient material such as neoprene or other rubber-like substance and having upper cylindrical portions 50a sized in conformity with the open end of bottle necks of conventional size, so that a said adapter collar may be applied loosely around the pipe 55 with the upper cylindrical portions 50a extending sealingly within the skirt element 50 of the attachment cap 42. The adapter collar may be formed with an integral outstanding peripheral flange 50f, below which it may comprise a downwardly tapering sleeve portion 50s adapted to be sealingly pressed into larger than normal bottle necks to thereby attach the cap 42 thereon.

Since the outwardly projecting ends of the sleeve 51 and tube 53 are sealed respectively to the manifold remote ends of the outer and inner coaxial tubes 41-A and 41-L, it will be seen that air pressure, applied through the tube 41-A to the chamber 47c in communication with the interior of the bottle B through its neck N, will act to force the liquid contents of the bottle upwardly through the tube 55, the channel 52, the tube 53, the inner coaxial tube 41-L, the manifold 39 and the liquid pipe 41, to the reservoir, thereby filling the same. Since the reservoir is a sealed vessel, closure of the vent 27, by action of the gasket 34 of the float 32 upon the end of the valve sleeve 29, will prevent delivery of liquid in a reservoir after the same shall have become filled to a desired level, as determined by the action of the float 32.

The cylinders C of the proportional measuring pump means may comprise sleeves 57 of any suitable relatively rigid and inert material, such as polystyrene, said sleeves being preferably mounted in and supported on a frame 58, which may conveniently comprise a block of plastic material, such as epoxy resin, formed with cavities 59 extending therethrough and sized to snugly receive, in frictionally fitted fashion therein, the basal ends of the sleeves 57, said basal ends of the sleeves being formed each with a peripheral flange 60 in position to engage in corresponding seats formed in the block constituting the frame 58 at the ends of the mounting sockets formed in the block by the cavities 59. The flanged ends of the cylinder sleeves 57 may be closed and the sleeves secured in mounted position in the frame forming block 58 by means of an overlying cover block 61 formed of any suitable or preferred material, such as epoxy resin, fastening screws 62 or other suitable means being provided for securing the blocks 58 and 61 detachably together. As shown, the screws are mounted in and through the block 61 and take threadingly into the block 58.

The cover block 61 also may provide a housing for valves 63 operable in unison to connect the cylinders C of the measuring pump means alternately with the reservoirs R and with the mixing manifold M, the valves 63 serving to connect the cylinders C with the reservoirs during the retracting or suction strokes of the pump pistons F, and with the mixing manifold M during the pressure or liquid delivery strokes thereof. To this end, the block 61 may be formed with a transverse valve housing channel 64 extending therein from one side thereof to the other, said channel preferably having a medial portion 65 of reduced diameter and larger end portions 66 opening at the opposite sides of the block, circumferential seats 67 being formed at the junction of the medial portion 65 with the opposite end portions 66. A valve actuating pinion gear 68 having oppositely extending axle pintles 69 may be disposed in the medial portion 65 of the valve channel, the pintles 69 being journaled for turning movement in preferably nylon bearing blocks 70 supported in the seats 67 at the opposite ends of the medial channel portion 65.

A preferably Teflon bearing sleeve 71 having an axial channel formed therethrough and tapering toward the medial channel portion 65 is mounted in each of the opposite end portions 66 of the valve channel, the bearing sleeves 71 being seated at their inner ends upon the bearing blocks 70. The valves 63 may comprise truncated conical elements, preferably of Teflon, shaped to snugly and turningly fit within the sleeves 71, the truncated ends of the conical elements being each formed with a diametrical slot adapted to drivingly interfit with a corresponding diametrical rib formed at the end of the facing pinion pintle, to thereby drivingly connect the valve elements 63 for turning movement with the pinion. End closure members 72, threaded or otherwise secured in the opposite open ends of the channel 64, and compression springs 73 disposed between the members 72 and the outwardly facing ends of the valve elements 63 may be provided to yieldingly urge the same mutually inwardly toward the pinion 68.

The axial bores of the sleeves 71 may be each connected with the inner or closed end of a corresponding cylinder C by means of a channel 75 formed radially through the sleeve 71 and in the block 61, said channels each opening into its corresponding cylinder. The blocks 61 and the sleeves 71 may also be formed with discharge ducts extending radially through the sleeves 71 and in the block 61, said ducts 76 opening upon the front face of the block 61, on opposite sides of the mixing manifold M, in position to be connected therewith by means of suitable, preferably vinyl plastic conduits 77. The discharge ducts 76 and the channels 75 are preferably formed in coaxial alignment in the block 61 on opposite sides of the end portions 66 of the valve channel, so that each channel 75 may be connected with its corresponding discharge duct 76 through a diametral bore 78 formed in the associated valve element 63, a branch duct 78a connected medially with the bore 78 being also formed in each valve element.

The valve structure may also include a supply duct 79 for each valve extending from the interior of the valve sleeve 71 and the block 61 in a direction angularly displaced about the axis of the valves with respect to the channels 75 and the ducts 76, said ducts 79 extending preferably at right angles with respect to the alined channels 75 and discharge ducts 76, and opening preferably at the bottom of the block 61. The lower ends of the ducts 79 may be provided with stop cocks 80 of the sort shown in FIG. 3, through which liquid may be drained as desired from the measuring and dispensing mechanism, said cocks conveniently comprising a body 80a formed with a chamber 80c opening at one end and a duct 80d communicating the bottom of the chamber with the opposite end of the body. The body is formed for preferably threaded attachment on the block 61 with the duct 80d in communication with a supply duct 79. The chamber 80c is sized to loosely receive a valve ball 80b and is threaded to receive a channeled plug 80p in position to seal the ball on a seat 80s formed at the junction of the duct 80d with the bottom of the chamber 80c, the ball engaging end of the plug being provided with radial grooves 80g in order to communicate the channel 80k of the plug with the chamber 80c, thereby permitting the cock to drain when the plug is unloosened to release the ball from engagement on the seat.

The blocks 61 may also be formed with service ducts 81 connected with the supply ducts 79 and extending thence in opposite directions to and opening at the opposite ends of the block 61, suitable conduit forming pipes 82, preferably of stainless steel, being employed to interconnect the ducts 81 each with the outlet duct 26 of a corresponding reservoir R. It will be seen that, by turning the valves alternately to the positions shown in FIGS. 6 and 7, the cylinders C may be connected alternately with the reservoirs R and the mixing chamber M. The pinion 68 may be turned in order to selectively communicate the cylinder connected channels 75 either with the supply and service ducts 79 and 81, as shown in FIG. 6 of the drawings, or to communicate the channels 75 with the discharge ducts 76, as shown in FIG. 7. Means may be provided for retracting the pistons F in the cylinders away from the head block 61, in the performance of a suction stroke while the valves 63 are in the FIG. 6 position connecting the cylinders each with its corresponding supply reservoir. As a consequence, a quantity of liquid may be drawn from each reservoir into the connected cylinder, during a suction stroke of the pistons, the quantity so drawn into a cylinder being proportional to the sectional area of the cylinder and the displacement of its associated piston. Means may also be provided for projecting the pistons in the cylinders toward the block 61, after conclusion of retracting cylinder charging movement of the pistons and while the valves 63 occupy the position shown in FIG. 7, so as to expel the measured fluid contents of the cylinders through the discharge ducts 76 and into the mixing chamber M, whence the mixed fluids may be delivered from the apparatus through the discharge spout D as a precisely measured and proportioned unit dispensation quantity. The pistons F and valves 63 may be actuated by drivingly connecting the same with a preferably electric motor PM, through suitable reduction gearing 85, the motor and gearing being disposed in the relatively deep rear portions of the housing immediately between its side walls. Suitable driving mechanism 86 may be provided for interconnecting the power output shaft 85s of the reduction gearing with the pistons F and the valve actuating pinion 68.

As a manufacturing convenience and to facilitate assembly operations in building and repairing the apparatus, the reservoirs R, the cylinder and valve mounting blocks 58 and 61, together with the apparatus components mounted thereon, as well as the motor PM, the gearing 85 and the driving mechanism 86 may conveniently be mounted upon a support frame comprising a pair of spaced apart angle members 87 secured on the bottom of the shallow housing portion 18. Resilient rubber-like grommets, preferably comprising Neoprene or similar synthetic elastic compound, may be used to mount the angle members in position extending in a direction substantially normal to the front panel 13 of the housing. The angle members may extend in the housing from near the front of its shallow portion to adjacent the rear wall thereof, said angle members having end portions extending above the deep housing portions 19 in position to support the motor PM and gearing 85 therein, the case or housing of the gearing being secured to a mounting plate 88 having opposite end edges extending beneath and secured to the angle members 87 at their rear ends to brace and rigidify the frame. The motor, of course, may be secured to the plate remote side of the gear case. The support frame may also include an upstanding end plate extending between and secured to the rear ends of the angle members 87 which, at their forward ends, are preferably secured to the opposite sides of the cylinder block 58, as by means of threaded studs or screws 90 extending through the angle members and taking into the body of the cylinder block. The block 58, at its opposite ends, may be formed with cut-away portions forming seats 91 for receiving the block attached ends of the angle members.

It will be seen that the cylinder block itself forms a component of the support frame, the valve block 61 being attached on the frame by means of the fastening screws 62, and the mixing chamber M, in turn, being supported on the valve block 61 and hence upon the frame, while the reservoirs R also are mechanically supported upon the valve block 61 by means of the stainless steel connection pipes 82. The frame may also comprise a pair of spaced apart bracing and guiding rods 92 extending above the angle members 87 and anchored at their opposite ends in the cylinder block 58 and on the frame end plate 89. The frame structure thus comprises the angle members 87, the motor mounting plate 88, the upstanding end plate 89, and piston block 58 and the bracing and guiding rods 92 and forms an exceedingly rigid structure for the support of the several operating components of the measuring and dispensing mechanism within the housing 12.

The pistons F, as shown more particularly in FIG. 9 of the drawings, may comprise heads 83 secured on piston rods 84 and sized to snugly and slidingly fit within the cylindrical shells 59 of the cylinders. The piston heads may conveniently comprise inert material, such as high impact polystyrene; and each head may embody an externally threaded cylindrical neck 83n, a cylindrical portion 83p of larger diameter and an outstanding peripheral flange 83f forming a shoulder 83s at one end of the neck at the end of the enlarged portion, the flange being sized to fit freely within its corresponding cylinder. The piston structure may also include a pair of sealing disks 83d concentrically mounted upon the threaded cylindrical neck portion 83n of the head and having offset marginal flanges for sealing engagement wipingly with the interior surface of the associated cylindrical shell 59, said sealing disks or washers being preferably reinforced by high impact polystyrene backing washers 83w separated on the cylindrical threaded portion of the head by means of a preferably high impact polystyrene spacing washer 83v disposed therebetween and surrounded by a felt ring 83r impregnated with a silicone lubricant.

The sealing disks and the backing and spacing washers may be clampingly secured upon the cylindrical threaded portion of the head by and between the shoulder formed by the enlarged portion 83p of the head and a clamping plate 83c threadedly secured upon the cylindrical portion 83n, the offset wiping flanges of the gaskets being held against the interior surface of the cooperating cylinder shell 59, as by means of preferably Neoprene "O" rings 83t seated upon the periphery of the enlarged portion of the head and upon a peripheral seat formed in the clamp plate behind the offset wiping flanges of the gasket.

The driving mechanism 86 for actuating the pistons F and the valves 63 may conveniently comprise a crank arm 93 drivingly connected on the power output shaft 85s of the motor driven reduction gearing 85. The crank arm 93 may be drivingly connected with one end of a connecting rod 95, as by means of a pivot pin 96 mounted on the crank arm in spaced relation with respect to the shaft 85s. The connecting rod 95, remote from the pivot pin 96, may be drivingly connected with a piston actuating frame comprising a bar 97 slidingly supported, at its opposite ends, for longitudinal reciprocating movement on the guiding and bracing rods 92 of the support frame, the bar 97 being provided with slide journals or bearing sleeves 98 at its opposite ends for engagement with the rods 92. Intermediate the bearing sleeves 98 and opposite the axes of the cylinders C, the bar 97 may be provided with openings, preferably fitted with bearing tubes 99 adapted to slidingly receive the piston rods 84, the piston rods extending through the bearing tubes 99 and the bar 97 and terminating between the bar 97 and the upstanding end plate 89 of the frame structure. The piston rods 84 preferably comprise tubes sized to slidingly fit within the bearing tubes 99, the piston rod tubes being preferably threaded at one end for engagement in a threaded socket 84s formed in the neck 83n of the piston head. The rod tubes 84 are also preferably threaded at their opposite ends for connection with correspondingly threaded collars 100. The collar carrying ends of the piston rod tubes are preferably mounted slidably on guide stems 101 anchored on the upstanding end plate 89 of the support frame and having ends extending within the piston rod tubes.

It will be seen from the foregoing that, when the reduction gearing 85 is operated to turn the crank arm 93, the bar 97 will be drawn away from the cylinders C and toward the collars 100 during the first half of the movement of the arm 93 around the axis of the drive shaft 85s. The bar 97 is provided with means adapted to engage the collars 100, during retracting movement of the bar 97 away from the cylinders, in order thus to draw the pistons F a desired distance away from the cylinder head block 61, the volumetric displacement of the piston in the cylinder being determined by the movement of the bar 97 after the piston moving means thereon makes engagement with the piston driving collars. In order to provide for altering the displacement of the pistons in the cylinders, to thereby vary the amount of liquid measured in the cylinders during piston retracting movement, means is provided for shifting the position of the piston moving means on the bar 97 so as to vary the suction stroke displacement of the pistons following engagement of the piston moving means with the collars 100.

To these ends, the piston moving means may comprise a plurality of thrust or pusher fingers 102 having various lengths, said fingers being secured on a support bar 103 mounted slidably for movement on the piston actuating bar 97 transversely of the piston rods, the finger support bar 103 being held on the piston actuating bar 97 as by means of a suitable bracket or clip 104. As shown, the bar 103 carries a set of three pusher fingers 102 for each cylinder, the bar 103 being shiftable to present any one of three desired finger pairs in position to engage and thereafter push the collars 100 during the piston retracting movement of the bar 97. Depending upon the length of the fingers thus positioned to engage the collars 100, the pistons will be pushingly or thrustingly moved by the fingers through corresponding displacements in the cylinders during the suction stroke of the proportional measuring pump means. The fingers may be and are preferably sized as to length so that, for each adjustment, the combined fluid volume measured by the pistons in the cylinders will be constant.

A pair of spaced apart upstanding yoke rods 105 may be provided, at one end of the bar 103, and a movable prong 106 adapted to extend between the rods 105 may be employed for shifting the piston stroke adjusting bar 103 on the piston driving bar 97. The prong 106 may be mounted on the end of an arm of plate-like character 107, said arm in turn being secured on a turnable stem 108 extending above and turnably supported on the cylinder block 58, the stem extending thence outwardly to and through the forward panel 13 of the housing and carrying a manually operable knob 109, in front of the panel, by means of which the position of the bar 103 may be adjusted, to thereby vary the proportions of the liquid mixture dispensed through the discharge spout D.

It will be seen that, after having been adjusted on the bar 97, the finger carrying bar 103, during the operating stroke of the bar 97, will be moved away from the cylinder block and hence will retract the bar adjusting yoke rods 105 from the prong 106. In order to prevent adjustment of the prong when the yoke rods 105 are retracted therefrom, the plate-like arm 107 may be provided with a plurality of perforations 110 corresponding with the several finger adjusting positions of the arm, a latch prong 111 being provided in position to engage lockingly in one or other of the perforations whenever the bar 103 and the yoke rods 105 are in retracted position disengaged from the prong 106. To this end, the latch prong 111 may be carried on a plate 112 slidingly mounted, at its opposite ends, on the stem 108 and on one of the rods 92, helical springs 113 on the stem 108 and rod 92 being provided to shift the prong carrying plate 112 so that the latch prong 111 may engage in a registering opening 110 in response to retracting movement of the frame 97, said frame when in normal or standby position serving to compress the springs 113 by action of a bearing sleeve 98 on the prong carrying plate 112 and thus retract the latch prong 111 from locking engagement with the arm 107.

During initial movement of the crank arm 93 from its normal standby or starting position shown in FIGS. 4, 5 and 6, the pistons F will remain stationary in the cylinders, during the lost motion travel of the thrust or pusher fingers and until the selected fingers 102 engage the piston moving collars 100, and the pistons, thereafter, will be retracted in the cylinders during the remaining movement of the crank arm toward its fully retracted position displaced 180° from its starting position. After reaching such fully retracted position, continued rotation of the arm 93 will, of course, return it to the start position, thereby moving the bar 97 and the piston retracting fingers 102 away from the collars 100. The pistons, during the initial portions of such return movement of the bar and fingers, remain stationary until the bar 97 has moved sufficiently on the piston rod sleeves 82 to engage the bar remote ends of the sleeves 99 with the facing ends of the necks 83n of the piston heads 83, after which continued movement of the bar 97 will return the pistons to the bottom or closed ends of the cylinders and accomplish the pressure stroke of the proportional pump means.

In order to turn the valves 63 to connect the reservoirs with the cylinders prior to the commencement of the suction strokes of the pistons in the cylinders, that is to say, during the interval prior to the engagement of the selected fingers 102 with the piston moving collars 100, the cylinder and valve blocks 58 and 61 may be provided with alined channels forming a passageway 114 therein for the accommodation of a rack 115 in position drivingly connected with the valve turning pinion gear 68. The pinion remote end of the rack 115 may extend outwardly of the piston block 58 intermediate the cylinders 57 and may be drivingly connected with the upturned end 116 of a preferably sheet metal rack driving plate 117 which extends above and is slidingly supported on the motor mounting plate 88, said rack driving plate 117 being formed with an elongated slot 118 for the accommodation of the crank arm driving shaft 85s while permitting sliding movement of the plate 117, on the mounting plate 88, diametrally of the shaft 85s. Spaced outwardly of the opposite ends of the slot 118, the plate 117 may be provided with a pair of upstanding cam flanges 119s and 119d in position to be engaged alternately by a plate driving cam roller 120 turnably mounted on the underside of the crank arm 93 in coaxial alinement with the pivot pin 96.

When the arm 93 is in its normal or standby position shown in FIGS. 4, 5 and 6, the roller 120 will be in position to engage the flange 119s as soon as the the arm 93 commences its rotation from starting position. As the cam roller traverses the flange 119s, it will shift the plate 117 toward the cylinder block and will consequently move the rack bar 115 in the channel 114 to turn the pinion 68 in the direction required to dispose the valves in the position illustrated in FIG. 6, thereby connecting the reservoirs with the cylinders. At the conclusion of the suction stroke of the mechanism, the crank arm roller 120 will be in position to engage and traverse the flange 119d, during the initial portions of the return stroke while the measuring pump pistons are stationary, to thereby retract the plate 117 away from the cylinder block and draw the rack in a direction to turn the pinion 68 to dispose the valves in the FIG. 7 position. As a consequence, continued movement of the crank arm 93 after the roller has traversed the flange 119d will result in discharge of the measured contents of the cylinders through the mixing chamber M and the discharge spout D.

As shown more particularly in FIG. 17 of the drawings, the operation of the mixing and dispensing apparatus may be accomplished electrically under the control of cam actuating switches operated automatically as the result of the turning movement of the crank arm 93. To this end, a cam disk or plate 121, having a preferably circular periphery 122 and a cam actuating projection 123 formed thereon, may be attached or otherwise formed on the crank arm 93. If desired, the switch actuating disk 121 and the crank arm may be formed as a single integral element, but, for manufacturing convenience, the switch actuating plate or disk 121 is preferably formed as a separate molded part which may comprise high impact polystyrene, or other suitable material. The cam disk may be formed with a central opening for receiving an embossment formed on the crank arm around the shaft 85s; and the plate 121 may also be formed with an opening through which the pivot pin 96 may be applied and secured in the crank arm, thereby fastening the plate 121 firmly to the arm 93.

The disk 121 is adapted to control the operation of a normally closed switch 124 and a normally open switch 125, the switch actuating projection 123 being disposed on the disk in such angular relation with respect to the crank arm 93 that it will hold the normally closed switch 124 in open condition while and so long as the crank arm is and remains in its normal standby or starting position, shown in FIGS. 4, 5 and 6, the projection 123 releasing the switch 124 and permitting it to close as soon as the crank arm 93 commences its rotary motion in the performance of the operating cycle of the apparatus. The normally open switch 125, on the other hand, may be closed momentarily, by action of the projection 123, during operating movement of the crank arm.

The electrical control system shown in FIG. 17 is adapted to control the operation of the air pump and piston driving motors AM and PM under the control of the switches 124 and 125 and a multiple station, manually adjustable selector switch 126, which may conveniently be mounted upon the inner face of the front panel 13 of the housing and drivingly connected with an operating knob 127 disposed in front of the panel. The electrical circuitry also may include suitable circuit protecting fuse means 128f and a disconnect switch 128 mounted on and operable from in front of the panel 13, a preferably amber signal lamp 129 for indicating whether or not the circuitry is operably energized through the fuse means and disconnect switch, a preferably red signal lamp 130 for indicating whether or not pneumatic pressure in the fluid forcing system is at a desired or required operating level, and a preferably green signal lamp 131 for indicating the operation of the measuring pump driving motor PM, said amber, red and green signal lamps being preferably mounted in position clearly visible from in front of the panel 13. The electrical system also may include a start button switch 132 preferably mounted on the front panel in position to be easily pushed to initiate the mixing and dispensing operation of the apparatus. An overriding switch 133 for operating the air pump motor, in order to prime or charge the reservoirs R with liquid prior to placing the apparatus in operation, may be mounted in any convenient, accessible location, in the apparatus, as on the bottom of the shallow casing portion 18 near the bottom of the front panel 13.

Mounted on or within the housing 12 and interconnected with the switches 124, 125, 126, 128, 132 and 133 are electric circuit components which may include a multiple position stepping switch 134 and its associated actuating and resetting coils 135 and 136 and resetting switch 136s, a pair of double pole, double throw switches 137 and 138 and their associated actuating coils 137c and 138c, the pressure actuated switch PS, and a normally open microswitch S adapted to be closed by the weight of a liquid receiver, such as the cocktail shaker G, when placed in liquid receiving position beneath the discharge spout D. In this connection, the microswitch S as shown in FIG. 4, may be conveniently mounted upon the back of the cylinder block 58 between the cylinder sleeves 57, with the actuating member or stem 139 of the switch projecting through and beneath the bottom wall of the shallow housing portion 18.

A rockable frame 140, having a switch actuating finger extending in position to overlie the projecting actuating stem 139, may be pivotally supported upon and outwardly of the bottom wall of the shallow casing portion, said frame being formed for preferably detachable connection with the opposite ends of a length of wire bent to form a vessel carrying rack 141, the frame 140 being formed with a pair of spaced, downwardly opening channels for receiving the opposite ends of the wire rack 141, and clamping nuts 142 being provided for detachably securing the ends of the rack in such channels. The rack 141 and its frame 140 may be disposed on the housing in position to support a liquid receiving vessel, such as the shaker G, immediately beneath the discharge spout D of the mixing manifold. Suitable spring biased means, which may be incorporated in the microswitch S itself, may be provided for normally holding the switch in its open position, the switch being thrown to closed position in response to the application of a liquid receiving vessel on the rack 141.

From the disconnect switch 128, one side L-1 of the power supply line may be connected in series through the start button switch 132 and the normally open microswitch S and thence to a distribution conductor 143. Between said distribution conductor 143 and the other side L-2 of the power supply line are connected several of the components of the system. The movable contact making arm or pole 144 of the multiple position selector switch 126 may be electrically connected with the distribution conductor 143 the multiple contacts of the selector switch being each connected with a corresponding contact of the step switch 134. The movable contact member or pole 145 of the step switch may be electrically connected with a bus conductor 146, which in turn may be connected with the line L-2, through the normally closed contacts of the single pole, double throw switch 133 and the air pump motor AM. The relay switch operating coil 137c is also connected between the distribution conductor 143 and the line L-2. The switch 124 is electrically connected between the distribution conductor 143 and the bus conductor 146.

The pressure switch PS may comprise a normally closed contactor 23c which is electrically connected between the distribution conductor 143 and the bus conductor 146, said normally closed contactor being opened by action of the pressure responsive device 22 whenever pressure in the pneumatic system, developed by operation of the air pump motor, reaches a selected value. In this connection, the air pump P may be of the conventional sort adapted to produce pressures of the order of five pounds per square inch, the regulating valve A being adjustable to provide pressure of the order of 1.75 pounds per square inch in the pneumatic system. The switch component PS also may include a normally open switch 23d adapted to be closed by action of the pressure responsive device 22 slightly before the normally closed switch is opened and to remain closed so long as said normally closed switch 23c remains open.

The normally open switch 23d may be interconnected between the bus conductor 146 and the line L-2 in series with the relay switch operating coil 138c. The bus conductor 146 may also be connected directly with the power supply conductor L-1 through a normally open switch 137a of the relay 137, a normally closed switch 137b of said relay being interconnected in series with the normally open contacts of the switch 133 and the air pump motor between the power supply lines L-1 and L-2. The operating coil 135 of the step switch 134 may be interconnected between the bus conductor 146 and the power supply line L-2 in series with the normally open switch 125 and a normally open switch 137c of the relay 137, said relay having a normally closed switch 137d interconnected between the lines L-1 and L-2, in series with the reset coil 136 and the reset switch 136s of the step switch 134. The measuring pump driving motor PM may be electrically connected between the power supply lines L-1 and L-2 in series with a normally open switch 138b of the relay 138, a normally closed switch 138c and another normally open switch 138d, which are respectively interconnected in series with the red and green signal lamps 130 and 131, between the bus conductor 146 and the power supply line L-2, the amber signal lamp 129 being directly connected between the power supply lines L-1 and L-2.

In order to operate the apparatus, the proportion selecting knob 109 may first be adjusted to aline, with the measuring pump driving collars 100, a desired pair of fingers 102, corresponding with the selected mixing proportions. The disconnect switch 128 being closed, and the microswitch S being also closed, due to the presence of a liquid receiver G on the rack 141, in liquid receiving position beneath the discharge spout D, momentary closure of the start button switch 132 will first cause the relay coil 137c to be energized, thus closing switches 137a and 137c and opening switches 137b and 137d of relay 137. Closure of switch 137a places the air pump motor AM in operation by completion of the circuit from the power supply line L-1 through the normally open, now closed relay switch 137a, the normally closed contacts of the switch 133 and the air pump motor PM to the power supply line L-2. Closure of switch 137a also connects one side of the switch 124 with the power supply line L-1, while closure of the switch 137c connects one side of the switch 125 with the power supply line L-2. Upon release and consequent opening of the start button switch 132, the relay switch coil 137c will remain energized, since closure of the switch 137a connects it in a circuit from the power supply line L-1 through the switch 137a, the bus conductor 146, the normally closed contact of the pressure switch PS, the conductor 143 and thence through the coil 137c to the power supply line L-2.

As soon as operation of the air pump motor shall have produced sufficient pressure in the pneumatic system to actuate the responsive device 22 to open the normally closed contactor 23c of the pressure switch PS, the relay coil 138c becomes energized through the connection formed between the power supply lines L-1 and L-2 by a circuit including the normally open, now closed, contactor 23d of the pressure switch PS, and the normally open, now closed, relay switch 137a. As soon as the relay coil 138c thus becomes energized, the relay 138 operates to close its normally open switches 138b and 138d and to open its normally closed switches 138a and 138c. Closure of the switch 138b causes operation of the measuring pump driving motor PM, by connecting it directly with the supply line conductors L-1 and L-2. As soon as the measuring pump driving motor starts in operation, movement of the cam plate 121 releases the switch 124 which consequently assumes its normal closed condition, thus interconnecting the conductors 143 and 146 and thereby maintaining an energizing circuit for the relay coil 137c after opening of the normally closed contactor 23c of the pressure switch PS.

Movement of the switch actuating disk 121 momentarily closes the normally open switch 125 once during each operating rotation thereof, thereby energizing the actuating coil 135 of the step switch 134, by connecting the coil 135 between the supply conductors L-1 and L-2 through a circuit including the normally open, now closed, relay switch 137a, the conductor 146, the coil 135, the momentarily closed switch 125, and the normally open, now closed, relay switch 137c. When the coil 135 is thus energized, it moves the pole 145 of the step switch from engagement with one step switch contact to the next adjacent contact. If the manual switch 126 previously shall have been adjusted to engage the corresponding connected contact of the manual switch, the relay coil 137c will continue to be energized, through the circuit established, between the conductors 143 and 146, by the interconnected manual and step switches 126 and 134, after the projection 123 of the switch actuating disk 121 shall have opened the switch 124, upon the completion of a single rotation of the crank arm 93 causing one complete measuring and dispensing cycle of the pistons F in the cylinders C.

As a consequence, if the arm 144 of the selector 126 is adjusted to the unconnected first contact of the switch, the mechanism will perform but one measuring and dispensing cycle of the measuring pumps, so that but a single dispensation unit quantity of mixed fluids will be delivered through the discharge spout D into the receiver G. If, however, the selector switch arm 144 be adjusted to bridge any or all of the remaining or connected contacts of the switch, the apparatus will repeat its operating cycle a number of times corresponding with the number of contacts bridged by the adjustable pole 144 of the selector switch, and will discharge a corresponding number of dispensation unit quantities of the fluid mixture successively into the receiver G, the pole 144 of the manually operable selector switch being adapted to bridge and hence electrically interconnect any desired number of the switch contacts.

Upon the opening of the switch 124 at the conclusion of the operation of the apparatus, as determined by the number of cycles selected by the adjustment of the switch 126, the relay coil 137c becomes de-energized thereby permitting the relay 137 to resume its normal or standby position in which the relay switches 137a and 137c are open, and the switches 137b and 137d are closed. Closure of the switch 137d may energize the reset coil 136 to return the step switch to its normal standby or starting position, with its movable pole 145 in engagement with the first or unconnected stationary contact of the switch, the coil 136 being connected in series with the relay switch 137d and the reset switch 136s, between the power supply lines L-1 and L-2.

The reset switch 136s may comprise a conventional normally open reset switch which remains open so long as the step switch arm 145 is in normal standby or starting position, but which closes and remains closed so long as the arm 145 is in or occupies any relatively shifted position other than the start position. Accordingly, upon closure of the relay switch 137d, the step switch 134 will remain in starting position if it shall not have been shifted therefrom as the result of the performance of an immediately preceding cycle of operation of the apparatus; but, if the shiftable pole 145 of the step switch should occupy any position relatively shifted from standby position, at the conclusion of an operating cycle of the apparatus, closure of the relay switch 137d will immediately cause the arm of the step switch to return to its normal standby or starting position.

Upon the opening of the relay switch 137a at the conclusion of an operating cycle or cycles of the apparatus, as determined by the setting of the manual switch 126, the air pump motor AM will stop, thereby reducing the pressure in the pneumatic system to a level such that the responsive device 22 will permit the pressure switch PS to assume its normal position with its contactors 23c and 23d respectively closed and open. The opening of contactor 23d breaks the energizing circuit through the relay coil 138c, thereby causing the relay switch 138b to open and stop operation of the measuring pump driving motor PM.

The present invention is not necessarily restricted to the mixing of fluids in any particular proportions or to the mixing of liquid beverage ingredients; indeed, the disclosed principles of the invention may be applied to the mixing of any desired number of fluid components in any desired proportions. The apparatus of the present invention, however, has particular utility in providing for the mixing of two liquids, such as the Vermouth and gin or whiskey components of Martini or Manhattan cocktails. When so applied, apparatus embodying the invention provides for the exceedingly rapid, automatic dispensation of such liquid mixtures, in precisely measured proportions which may be determined by the relative lengths of the liquid proportion regulating fingers 102. In this connection, the herein described mixing and dispensing apparatus not only permits the mixing and dispensation of a desired number of dispensation unit quantities or "drinks" in rapid succession, or singly if desired, but also assures that each drink or dispensation unit quantity will be precisely measured as well as being accurately proportioned, a further advantage arising from the intimate and thorough mixing of the ingredients, at normal bottle temperature, in the mixing chamber M, prior to the discharge thereof through spout D. The resulting mixture, as discharged from the spout, is so perfectly homogeneous that it is unnecessary to stir or shake up the mixture in the manner heretofore considered essential to adequately blend the components, as in a cocktail shaker with ice.

The herein described apparatus, moreover, operates rapidly and efficiently to mix and dispense dispensation unit quantities at high speed, a single operating cycle as represented by a suction and discharge stroke of the liquid measuring and dispensing pumps being accomplished in an interval of the order of two seconds. The apparatus of the present invention thus is not only much more accurate but infinitely faster, in producing drink mixtures, than even the most expert bartender. Furthermore, the apparatus of the present invention entirely eliminates the loss of valuable liquor due to spillage that is unavoidable when drinks are mixed by hand, especially during intervals or rush business at service bars.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Apparatus of the character described comprising means forming a plurality of closed vessels constituting fluid reservoirs each having an inlet, an outlet and a vent, pumps for withdrawing fluid from the reservoirs and delivering the same to a common mixing chamber, valve means operable to alternately connect said pumps each with the outlet of a corresponding reservoir and with said mixing chamber while sealing the pumps from the reservoirs, and fluid forcing means for delivering fluid from corresponding supply sources to the inlets of said reservoirs, including a valve in each reservoir and responsive to the presence of a definite quantity of fluid in the reservoir to seal the vent and thus preclude the delivery of more fluid therein, so long as the valve remains closed, said valve serving to open the vent in response to withdrawal of fluid from the reservoir by operation of the connected pump, to thereby permit instant replenishment of fluid in the reservoirs as soon as fluid is drawn therefrom by the pumps.

2. Apparatus as set forth in claim 1, wherein the pumps each comprise a cylinder having a piston movable therein, driving means for moving the pistons in unison to draw fluid into the cylinders, while the same are connected with said reservoirs, and to expel fluid therefrom when the same are connected with said mixing chamber, and means adjustable to determine the displacement of a said piston in its associated cylinder.

3. Apparatus as set forth in claim 1, wherein the pumps each comprise a cylinder having a piston movable therein, and driving means for moving the pistons to draw fluid into the cylinders, while the same are connected with said reservoirs, and to expel fluid from the cylinders when the same are connected with said mixing chamber, the cylinders of the several pumps being of unlike diametral size, thereby constituting the same as a proportional measuring device operable to draw measured quantities of fluid from said reservoirs, and, when connected with the common mixing chamber, to dispense said measured quantities as an accurately proportioned mixture.

4. Apparatus as set forth in claim 1, wherein the pumps each comprise a cylinder having a piston movable therein, valve means operable to connect the cylinders each wtih a corresponding reservoir and alternately with the common mixing chamber, and driving means for moving the pistons in unison to draw fluid into the cylinders, while connected with said reservoirs, and to expel fluid therefrom when connected with said mixing chamber.

5. Apparatus of the character described comprising measuring pump means embodying a plurality of cylinders each having a piston movable therein, valve means operable to connect each cylinder successively with a corresponding fluid supply container and with a common mixing chamber, a said piston having an abutment carrying piston rod connected therewith for moving the same in its associated cylinder, and piston driving means comprising a frame reciprocable between excursion limits defining the operating stroke of the frame, thrust means on said frame in position to engage the piston rod abutment, after the frame shall have moved in one direction, from a starting position, through a desired displacement less than its operating stroke, during the remainder of its movement in said one direction, to retract the piston a desired distance in its associated cylinder while the same is connected with said supply container.

6. Apparatus as set forth in claim 5, wherein the thrust means is adjustable on the frame to vary the displacement of the frame from its starting position at which the thrust means makes piston retracting engagement with the abutment.

7. Apparatus of the character described comprising measuring pump means embodying a plurality of cylinders each having a piston movable therein, valve means operable to connect each cylinder successively with a corresponding fluid supply container and with a common mixing chamber, driving means for moving the pistons through a desired displacement in the cylinders to draw fluid into the same, while connected with said supply containers, and to expel fluid therefrom when connected with said mixing chamber, and adjustable means operable to alter the displacement of a said piston in its associated cylinder, said driving means embodying a reciprocable frame having lost motion connection with the said piston and said adjustable means being operable to vary the amount of motion lost in said connection.

8. Apparatus of the character described comprising measuring pump means embodying a plurality of cylinders each having a piston movable therein, valve means operable to connect each cylinder successively with a corresponding fluid supply container and with a common mixing chamber, driving means for moving the pistons through a desired displacement in the cylinders to draw fluid into the same, while connected with said supply containers, and to expel fluid therefrom when connected with said mixing chamber, and means adjustable to alter the displacement of a said piston in its associated cylinder and to correspondingly alter the displacement of another of said pistons in its associated cylinder to maintain constant the aggregate volume of fluid delivered to the mixing chamber regardless of the adjustment of piston displacement.

9. Apparatus of the character described comprising measuring pump means embodying a plurality of cylinders each having a piston movable therein, valve means operable to connect each cylinder successively with a corresponding fluid supply container and with a common mixing chamber, lost motion driving means for moving the pistons in the cylinders to draw fluid into the same, while connected with said supply containers, and to expel fluid therefrom when connected with said mixing chamber, and adjustable means operable to alter the displacement of a said piston in its associated cylinder, said piston having an abutment carrying piston rod connected therewith for moving the same in its associated cylinder, said lost motion driving means comprising a reciprocable frame carrying a plurality of thrust pins of unlike length extending from the frame toward the piston rod abutment and selectively positionable to engage the abutment and thereafter to move the piston in the cylinder after the frame shall have moved from a starting position through a lost motion displacement distance determined by the length of the selectively positioned pin.

10. Apparatus of the character described comprising a plurality of fluid reservoirs, fluid forcing means for delivering fluid from corresponding supply sources into said reservoirs, measuring means embodying a plurality of pumps, a valve for each pump and positionable alternately to connect its associated pump with a corresponding one of said reservoirs and alternately with a common mixing chamber, driving means for operating said pumps, and disabling means operable in response to a deficiency of fluid in a said reservoir to stop operation of said driving means.

11. Apparatus as set forth in claim 10, wherein said fluid forcing means comprises a source of pneumatic pressure and means to apply the same at a supply source to deliver fluid thence to a said reservoir, and wherein the disabling means is operable in response to reduction in said pneumatic pressure below a selected level.

12. Apparatus of the character described comprising a plurality of fluid reservoirs, fluid forcing means for delivering fluid from corresponding supply sources into said reservoirs, measuring means embodying a plurality of pumps, including cylinders and associated pistons, a valve for each pump operable alternately to connect its associated pump with a corresponding one of said reservoirs and alternately with a common mixing chamber, driving means for operating said pumps in the performance of successive suction and discharge strokes, and valve actuating means operated by said driving means in unison with the suction and discharge strokes of said pistons, the valves being drivingly connected with a common pinion, a rack drivingly connected with the pinion, said driving means comprising a crank member connected to actuate the pump pistons, and cam means driven in unison with a crank member for reciprocating said rack.

13. Apparatus of the character mentioned embodying a pneumatic fluid forcing attachment for a fluid container such as a necked bottle, comprising an open-ended housing formed for grasping by hand, concentric open-ended chamber forming elements secured in said housing in position with the concentric open ends of said elements opening outwardly at the open end of said housing, an extension tube sealed at one end to the open end of the inner of said chamber forming elements, a resilient sleeve on and dependent from the open end of the outermost chamber forming element, and sized to sealingly embrace the neck of the container to connect the open end of said outermost chamber forming element with the neck of the container, with the extension tube disposed within the container in position with its other end submerged in the fluid contents of the container, and nipples connected with said chamber forming elements and opening outwardly of said handle forming housing elements and extending outwardly through said housing and liquid delivery conduit tubes.

14. Apparatus as set forth in claim 13, including an adapter sleeve having a formed end adapted to frictionally fit within the neck of a container, such as a bottle, loosely around the extension tube, and an opposite end sized to sealingly fit within the sleeve.

15. Apparatus of the character mentioned embodying a pneumatic manifold comprising a pair of concentric parts, including an inner part forming a central channel extending through an opening at the opposite ends of the manifold and an outer part forming an outer chamber surrounding the central channel, said parts forming concentric nipples at one end of the manifold, coaxial conduits sealingly connected with said concentric nipples for the delivery of fluid and pneumatic pressure through the manifold, the inner part forming an axial nipple at the opposite end of the manifold, and a radial nipple formed on the outer part and having communication with the outer chamber.

16. Apparatus of the character described embodying a fluid reservoir comprising a hollow, open ended vessel and a cover for detachably receiving and closing the open end of the vessel, said cover comprising a block of material formed with fluid inlet, outlet and vent ducts connected with the interior of the open ended vessel, said ducts opening outwardly of the cover for connection respectively with a supply source of fluid, a fluid delivery chamber and a venting station, means forming a vent valve at the vessel connecting end of the vent duct, and a valve controlling float mounted upon said cover in position to immerse in liquid delivered into the vessel through said inlet opening.

17. Apparatus of the character mentioned comprising means forming a plurality of fluid reservoirs, a pneumatic fluid forcing system including a pump, conduits for applying pump pressure on fluids at fluid supply sources, fluid delivery lines for conducting pressurized fluid from the sources to the reservoirs, a plurality of measuring cylinders each having a piston movable therein, and valve means operable to connect the cylinders successively each with its corresponding reservoir and with a common mixing chamber respectively while the pistons are moved to draw fluid into and to expel fluid from the cylinders in the performance of a complete measuring, mixing and dispensing cycle, including motor means for driving the pneumatic pump and measuring pistons, and means for preventing operation of the apparatus upon failure of fluid forcing pressure in the pneumatic system.

18. Apparatus of the character mentioned comprising means forming a plurality of fluid reservoirs, a pneumatic fluid forcing system including a pump, conduits for applying pump pressure on fluids at fluid supply sources, fluid delivery lines for conducting pressurized fluid from the sources to the reservoirs, a plurality of measuring cylinders each having a piston movable therein, and valve means operable to connect the cylinders successively each with its corresponding reservoir and with a common mixing chamber respectively while the pistons are moved to draw fluid into and to expel fluid from the cylinders in the performance of a complete measuring, mixing and dispensing cycle, including motor means for driving the pneumatic pump and measuring pistons, carrying means for supporting a mixed fluid receiver at said mixing chamber, and means for preventing operation of the apparatus in the absence of a receiver on said carrying means.

19. Apparatus of the character mentioned comprising means forming a plurality of fluid reservoirs, a pneumatic fluid forcing system including a pump, conduits for applying pump pressure on fluids at fluid supply sources, fluid delivery lines for conducting pressurized fluid from the sources to the reservoirs, a plurality of measuring cylinders each having a piston movable therein, and valve means operable to connect the cylinders successively each with its corresponding reservoir and with a common mixing chamber respectively while the pistons are moved to draw fluid into and to expel fluid from the cylinders in the performance of a complete measuring, mixing and dispensing cycle, including an electric pump motor connected with the pneumatic pump, piston and valve actuating mechanism embodying a member turnable through a single rotation in driving the valves and measuring pistons through a single measuring, mixing and dispensing cycle, an electric piston and valve driving motor connected to drive said actuating mechanism, and an electrical control system for said motors comprising a starting switch, a control relay actuated by said starting switch to start and maintain the pump motor in operation, a holding relay for starting and maintaining the piston and valve driving motor in operation in response to pneumatic pressure producing operation of the pump motor, and a control switch closed during rotation of the turnable member in the performance of a measuring, mixing and discharging cycle of the apparatus and opened to actuate the control relay and thus disable the system at the conclusion of a measuring, mixing and dispening cycle.

20. Apparatus as set forth in claim 19, including a normally open switch connected in series with the starting switch and disposed in position to be closed by the weight of a fluid container disposed in position to receive mixed fluid discharged from the mixing chamber, whereby to inhibit operation of the apparatus in the absence of a container in fluid receiving position.

21. Apparatus as set forth in claim 19, wherein the control relay in standby condition provides a closed switch element and a normally open over-ride switch connected in circuit with said closed switch element and the pump motor for actuating the pneumatic pump to charge fluid into the reservoirs to prime the same, while the apparatus is inactive.

22. Apparatus as set forth in claim 19, including a normally open switch connected to control the operation of the holding relay, said switch being adapted to close in response to the production of pressure, above a minimum operating level, in the pneumatic system in response to the operation of the pump motor.

23. Apparatus as set forth in claim 19, including a multiple position selector switch and a step switch connected in series across the control switch, said selector switch being adjustable and the step switch operable to maintain the control relay in operation during a selected number of operating cycles, despite the opening of the control switch at the conclusion of each cycle.

24. Apparatus as set forth in claim 19, including a multiple position selector switch and a step switch connected in series across the control switch, said selector switch being adjustable and the step switch operable to maintain the control relay in operation during a selected number of operating cycles, despite the opening of the control switch at the conclusion of each cycle, an actuator switch closed once during each operating cycle of the actuating mechanism to advance the step switch, and a step switch resetting coil and switch.

25. Apparatus of the character described comprising a plurality of fluid reservoirs, fluid forcing means for delivering fluid from corresponding supply sources into said reservoirs, measuring means embodying a plurality of pumps, said pumps comprising a cylinder block providing cylinder cavities therein, a piston movable in each cavity, a head block secured on the cylinder block in position closing the head end of said cavities, said head block being formed with a channel extending transversely of the cylinders and forming valve seating stations respectively opposite and communicating with said cylinders, valve means extending in said channel and providing a valve in each of said stations, said valves being operable in unison each to connect its associated pump with a corresponding one of said reservoirs and alternately with a common mixing chamber, driving means for operating said pumps in the performance of successive suction and discharge strokes, and valve actuating means operated by said driving means in unison with the suction and discharge strokes of said pistons.

References Cited in the file of this patent
UNITED STATES PATENTS

| | | |
|---|---|---|
| 1,006,923 | Daly | Oct. 24, 1911 |
| 2,106,492 | Adams | Jan. 25, 1938 |
| 2,154,647 | West | Apr. 18, 1939 |
| 2,310,714 | Slaughter | Feb. 9, 1943 |
| 2,775,870 | Bruce et al. | Jan. 1, 1957 |
| 2,788,953 | Schneider | Apr. 16, 1957 |
| 2,946,488 | Kraft | July 26, 1960 |

FOREIGN PATENTS

| | | |
|---|---|---|
| 748,911 | Great Britain | May 16, 1956 |